United States Patent [19]
Amano

[11] Patent Number: 5,845,164
[45] Date of Patent: Dec. 1, 1998

[54] CONTROL APPARATUS FOR A CAMERA WITH AN INDEX MARK DETECTION FEATURE

[75] Inventor: Kenichiro Amano, Kawasaki, Japan

[73] Assignee: Canon Kabushiki Kaisha, Tokyo, Japan

[21] Appl. No.: 932,915

[22] Filed: Sep. 18, 1997

Related U.S. Application Data

[63] Continuation of Ser. No. 567,063, Dec. 4, 1995, abandoned, which is a continuation of Ser. No. 143,066, Oct. 29, 1993, abandoned.

[30] Foreign Application Priority Data

Oct. 29, 1992 [JP] Japan ..................................... 4-312679

[51] Int. Cl.[6] ....................................................... G03B 1/18
[52] U.S. Cl. .......................................... 396/397; 396/410
[58] Field of Search ................................... 396/387, 395, 396/397, 406, 407, 409, 410

[56] References Cited

U.S. PATENT DOCUMENTS

| 4,431,292 | 2/1984 | Takahashi | 354/173.11 |
| 4,714,938 | 12/1987 | Kazami et al. | 354/173.1 |
| 4,721,970 | 1/1988 | Beaver | 354/173.1 X |
| 4,980,710 | 12/1990 | Harvey | 354/173.1 |
| 4,987,431 | 1/1991 | Harvey | 354/173.1 X |
| 5,057,859 | 10/1991 | Ishimaru | 354/173.1 X |
| 5,166,715 | 11/1992 | Labaziewicz | 354/173.1 |
| 5,210,562 | 5/1993 | Miyazawa et al. | 354/173.1 X |

FOREIGN PATENT DOCUMENTS

| 4-60530 | 2/1992 | Japan . |
| 4-180046 | 6/1992 | Japan . |
| 4-212943 | 8/1992 | Japan . |
| 5-11326 | 1/1993 | Japan . |
| 5-127238 | 5/1993 | Japan . |

*Primary Examiner*—Eddie C. Lee
*Assistant Examiner*—J. K. Han
*Attorney, Agent, or Firm*—Fitzpatrick, Cella, Harper & Scinto

[57] ABSTRACT

A control apparatus for a camera using an image recording medium having at least one index mark and a plurality of frames, the control apparatus includes frame transporting portion for effecting the frame transportation of the image recording medium, a detecting portion for detecting an index mark provided for the image recording medium, a determining portion for determining the presence of a final frame, and a control portion for effecting a predetermined control operation by the detecting portion detecting the initial index mark after the frame transportation of the final frame is started by the frame transporting portion, in response to the determining portion determining the final frame.

130 Claims, 13 Drawing Sheets

CONTROL APPARATUS FOR A CAMERA WITH AN INDEX MARK DETECTION FEATURE

This application is a continuation of application Ser. No. 08/567,063 filed Dec. 4, 1995, which is a continuation of application Ser. No. 08/143.066 filed Oct. 29, 1993, both now abandoned.

BACKGROUND OF THE INVENTION

1. Field of the Invention

This invention relates to a control apparatus for a camera, which is associated with winding, rewinding, stoppage, etc. of film.

2. Related Background Art

There has heretofore been proposed a camera designed in such a manner that the number of frames of film is read from a film cartridge and further the number of exposed frames is actually counted and when the two are coincident with each other (that is, in the case of the last frame), film winding is not effected, but film rewinding is executed, whereby the winding time and rewinding time for the last frame can be shortened.

In the above-described example of the prior art, however, when imprinting on the film is to be executed during the film transporting operation or when the writing of information is to be effected on film having a magnetic layer, information recording becomes impossible unless winding of the last frame is effected, and this has led to a problem that the last frame also need be wound like the other frames and the winding time and rewinding time for the last frame cannot be shortened.

SUMMARY OF THE INVENTION

The present invention has been made in view of the above-noted circumstances, and one aspect thereof is the provision of a control apparatus for a camera including frame transporting means for effecting frame transportation of an image recording medium, detecting means for detecting an index mark provided in the image recording medium, determining means for determining the last frame, and control means for effecting predetermined control by said detecting means detecting the first index mark after the frame transportation of the last frame is started by said frame transporting means, in response to the determining means determining the last frame.

Another aspect of the present invention is the provision of a control apparatus for a camera including frame transporting means for effecting frame transportation of an image recording medium, detecting means for detecting an index mark provided in the image recording medium, and time counting means for starting time counting in response to the detecting means detecting the first index mark after the frame transportation is started by the frame transporting means.

Another aspect of the present invention is the provision of a control apparatus for a camera including frame transporting means for effecting frame transportation of an image recording medium, first detecting means for detecting an index mark provided in the image recording medium during the frame transporting operation of the image recording medium by the frame transporting means, second detecting means for detecting the index mark provided in said image recording medium when the frame transporting operation of the image recording medium by the frame transporting means is not being performed, first determining means for effecting a first determination in response to said first detecting means, and second determining means for effecting a second determination in response to the second detecting means.

Another aspect of the present invention is the provision of a camera including frame transporting means for effecting the frame transportation of an image recording medium, detecting means for detecting an index mark provided in the image recording medium, determination means for determining the last frame, and control means for effecting predetermined control by the detecting means detecting the first one of the index marks after the frame transportation of the last frame is started by said frame transporting means, in response to the determining means determining the last frame.

Another aspect of the present invention is the provision of a camera including frame transporting means for effecting the frame transportation of an image recording medium, detecting means for detecting index mark provided in the image recording medium, and time counting means for starting time counting in response to said detecting means detecting the first one of the index mark after the frame transportation is started by the frame transporting means.

Another aspect of the present invention is the provision of a camera including frame transporting means for effecting the frame transportation of an image recording medium, first detecting means for detecting index mark provided in the image recording medium during the frame transporting operation of said image recording medium by the frame transporting means, second detecting means for detecting the index mark provided in the image recording medium when the frame transporting operation of the image recording medium by the frame transporting means is not being performed, first determining means for effecting first determination in response to said first detecting means, and second determining means for effecting second determination in response to the second detecting means.

Other aspects of the present invention will become apparent from the following detailed description of some embodiments of the invention.

DETAILED DESCRIPTION OF THE PREFERRED EMBODIMENTS

Some embodiments of the present invention will hereinafter be described with reference to the drawings.

Figure 1:
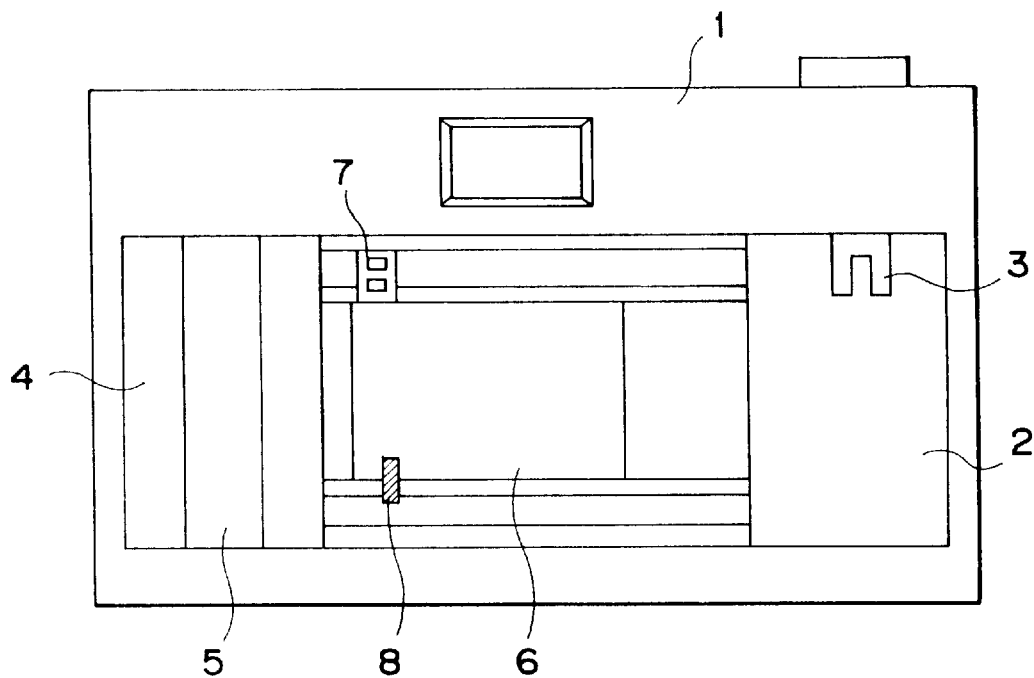
FIG. 1 is a rear view of a camera which is a first embodiment of the present invention with the back lid thereof removed.

FIGS. 1 to 5 show a first embodiment of the present invention, and FIG. 1 is a rear view showing the camera of this embodiment with the back lid thereof removed.

In FIG. 1, reference numeral 1 designates a camera body, reference numeral 2 denotes a cartridge chamber, reference numeral 3 designates a fork, reference numeral 4 denotes a spool chamber, and reference numeral 5 designates a film take-up spool. Reference numeral 6 denotes an aperture of the camera in which film is exposed. Reference numeral 7 designates a photoreflector disposed on the left support portion of the camera as viewed from the back of the camera, i.e., between a photographing frame and the next frame. The photoreflector 7 detects perforations in the film. Reference numeral 8 denotes a magnetic head adapted to be urged against the magnetic layer of the film to effect information recording.

Figure 2:
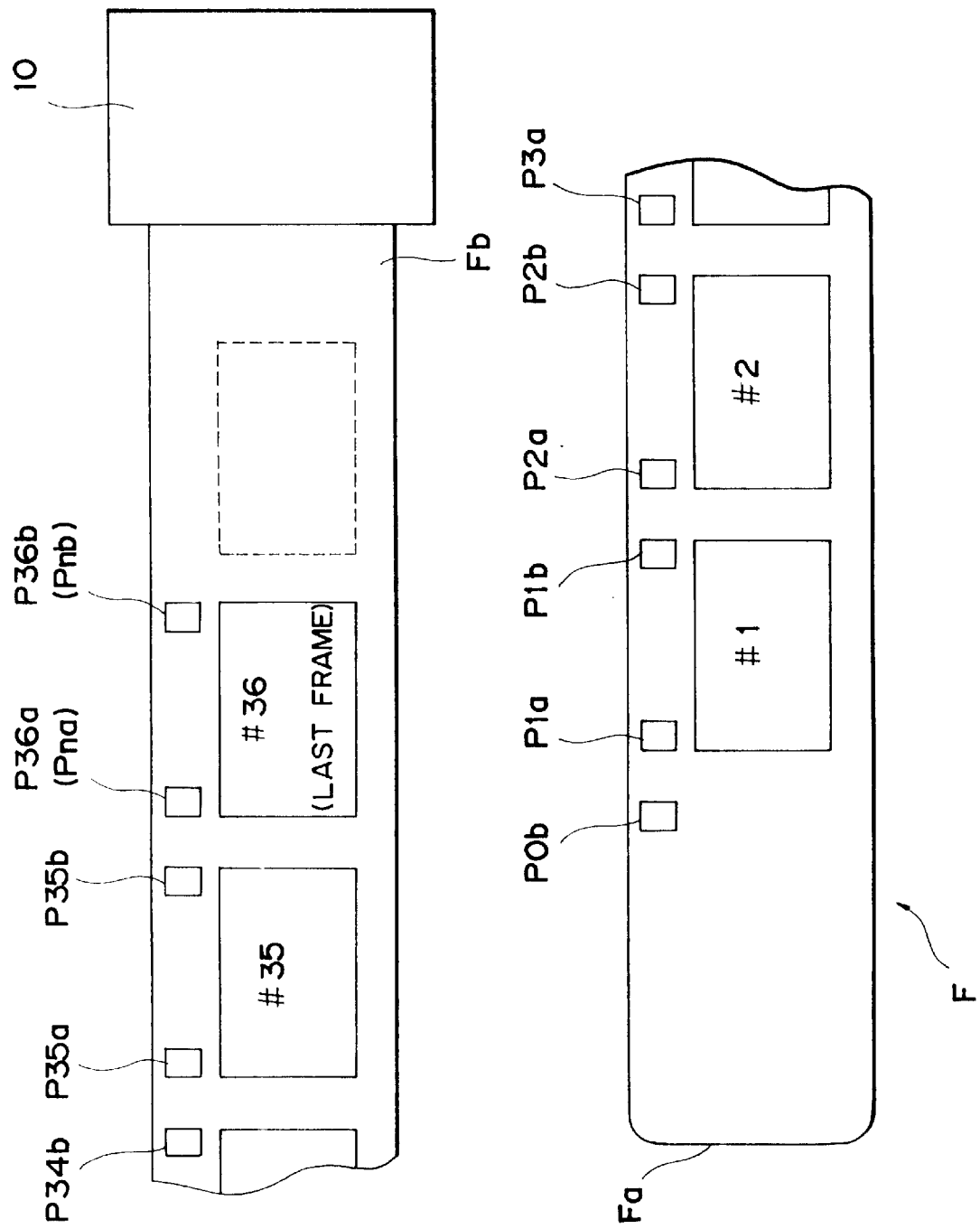
FIG. 2 illustrates film used in the embodiment of the present invention.

Referring now to FIG. 2 which shows the film used in the present embodiment, reference numeral 10 designates a film cartridge inserted into the cartridge chamber 2, and F denotes the film having two perforations P as index mark per image field, the left end and right end of the image field being represented by a and b, respectively, the numerals representing the corresponding frame numbers. That is, the left upper perforation in the first frame is represented by P1a, the right upper perforation in the first frame is represented by P1b, and likewise, the left upper perforation in the second frame is represented by P2a and the right upper perforation the second frame is represented by P2b, and the left upper perforation in the thirty-sixth frame which is the prescribed frame number in this example is represented by P36a (Pna), and the right upper perforation in the thirty-sixth frame is represented by P36b (Pnb). P0b designates a perforation in the leading end portion of the film which is used to index the first frame. Fa denotes the leading end portion of the film, and Fb designates the trailing end portion of the film.

The control of transportation is effected by the use of two perforations located at the left, for example, P0b and P1a for the first frame, and P1b and P2a for the second frame. Thus, the last frame has only one perforation P36b (Pnb).

Figure 3:
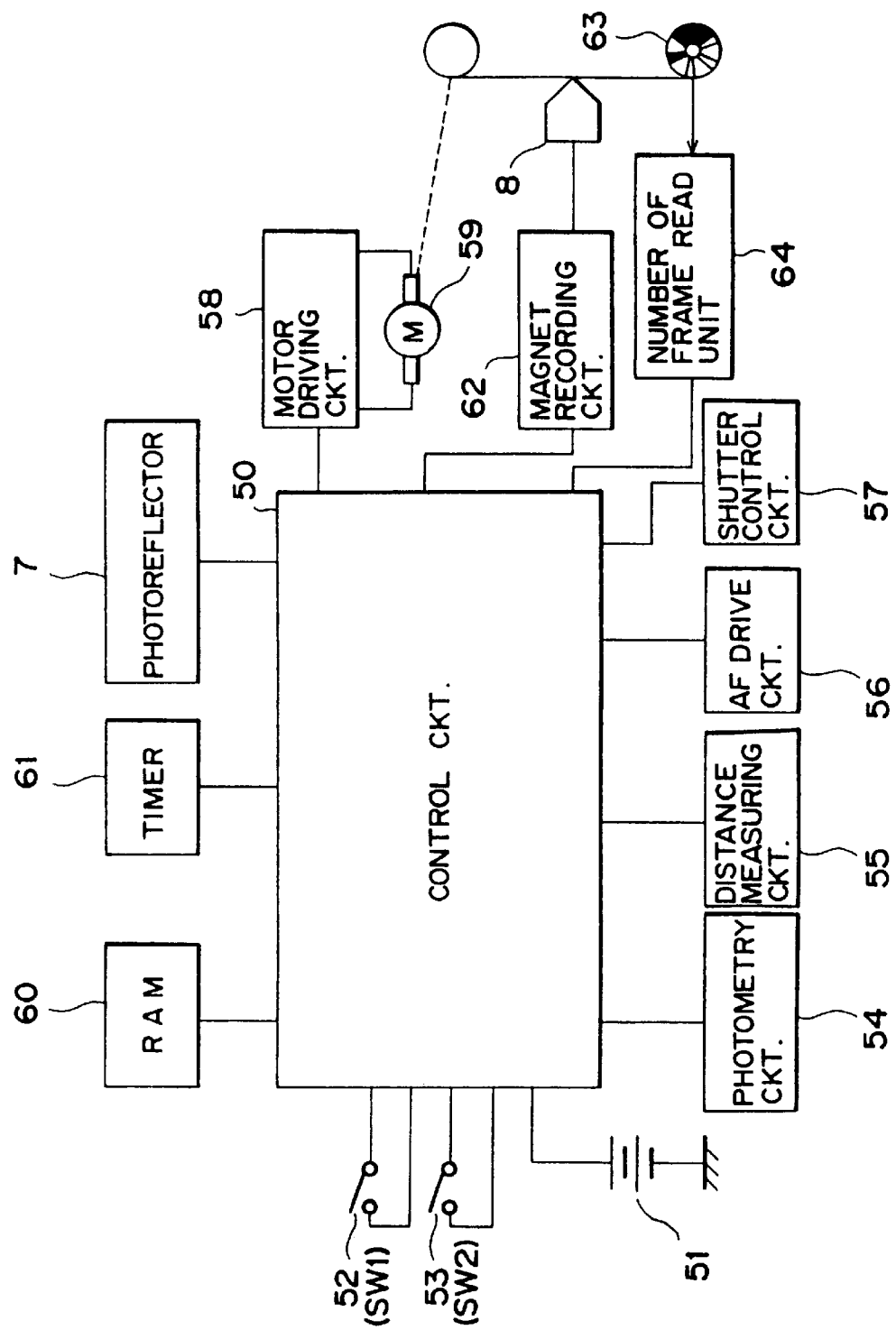
FIG. 3 is a block diagram schematically showing the construction of the camera of FIG. 1.

FIG. 3 is a block diagram showing the circuit construction of the camera according to the present embodiment. In FIG. 3, elements similar to those shown in FIG. 1 are given the same reference numerals and will not be described. Reference numeral 50 designates a control circuit comprised of a microcomputer or the like for controlling the various circuits of the camera, reference numeral 51 denotes a battery which is a power source, reference numeral 52 designates a switch adapted to be closed by the first stroke of a release button, reference numeral 53 denotes a release switch adapted to be closed by the second stroke of the release button, reference numeral 54 designates a photometry circuit for measuring the luminance of an object, reference numeral 55 denotes a distance measuring circuit for measuring the distance to the object, reference numeral 56 designates an AF drive circuit for effecting the focus adjustment of a photo-taking lens, not shown, on the basis of information from the distance measuring circuit 55, reference numeral 57 denotes a shutter control circuit for controlling the opening and closing of a shutter, reference numeral 58 designates a motor driving circuit for driving a film transporting motor 59, reference numeral 60 denotes an RAM, and reference numeral 61 designates a timer. Reference numeral 62 denotes a magnetic recording circuit for writing information to film, and reference numeral 64 designates a number of frame read unit for reading the number of frames recorded by a bar code 63 on the film cartridge.

Figure 4:
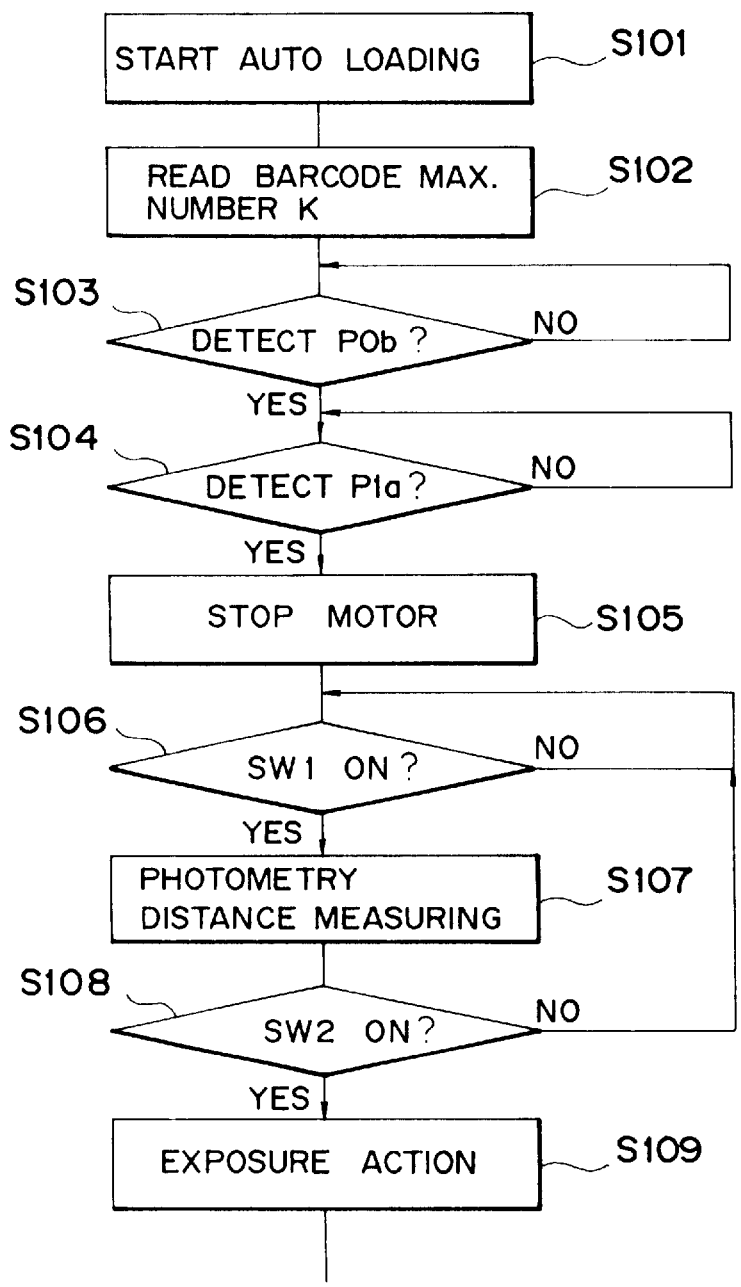
FIG. 4 is a flowchart showing film loading in the camera according to the first embodiment of the present invention and the photographing operation onto the first frame.

The operation after the film cartridge 10 is inserted into the cartridge chamber 2 of the camera will now be described with reference to the flowchart of FIG. 4 showing an operation of the control circuit 50. In FIG. 4, letter S means a step.

The driving of the motor 59 is started through the motor driving circuit 58. Thereby, the fork starts to be rotated and the supply spool in the film cartridge 10 which is engaged therewith also starts to be rotated, whereby the transportation of the film F is started. That is, the conventional auto-loading is started (S101). In accordance with the transportation of the film, information of the number of frames recorded by the bar code 63 on the film cartridge 10 is read by the number of frame read unit 64, and the value thereof is defined as K (S102).

Subsequently the photoreflector 7 is driven and the operation of detecting the perforation P0b in the leading end portion Fa of the film is started. When this perforation P0b is detected (S103), advance is made to S104, where the operation of detecting the perforation P1a provided in the left upper portion of the first frame is started. When this perforation P1a is detected, advance is made to S105, where the driving of the motor 59 is stopped through the motor driving circuit 58 (S105). At this point of time, the first (#1) frame of the film comes to the position of the aperture 6 of the camera. Whether the first stroke of the release button has then been done to close the switch 52 (SW1) is discriminated. If the switch SW1 is ON, advance is made to S107, and if the switch SW1 is OFF, the program stays at this step. When the switch SW1 is ON, the photometry circuit 54 and the distance measuring circuit 55 are driven to thereby obtain the information thereof.

Subsequently, whether the second stroke of the release button has been done to close the switch 53 (SW2) is discriminated. If the switch SW2 is ON, advance is made to S109, and if the switch SW2 is OFF, return is made to S106. When the switch SW2 is ON, the focus adjustment of the photo-taking lens, not shown, is effected through the AF drive circuit 56 on the basis of the information obtained by the distance measuring circuit 55, and then the shutter control circuit 57 is operated on the basis of the information obtained by the photometry circuit 54, whereby the opening and closing of the shutter, not shown, i.e., the exposure action, is effected (S109). Thereafter, as will hereinafter be described, driving of the motor 59 and driving of the photoreflector 7 are started through the motor driving circuit 58, whereby the winding of the first frame of the film F is effected.

Description will now be made of the winding operation after the photographing onto the usual frames and the last frame, i.e., the prescribed number of frames.

This operation will hereinafter be described with reference to the flowchart of FIG. 5. At S201, the operation of S106 to S109 in FIG. 4, i.e., the conventional release action, is effected. Subsequently, the motor 59 is driven through the motor driving circuit 58 to start winding of one frame of the film F (S202). At that time, magnetic recording is effected on the film through the magnetic recording circuit 62 and the magnetic head 8 (S203). The detection of the perforation Pnb is then effected by the photoreflector 7 (S204), and when this perforation Pnb is detected, advance is made to S205. At S205, the prescribed number of frames K read at S102 is compared with the number of exposed frames counted one by one during each release action, and if the two numbers are not coincident with each other, that frame is not determined as the last frame and S206–S210 are executed, and if the two numbers are coincident with each other, that frame is determined as the last frame and the operation of the motor 59 is stopped through the motor driving circuit 58 (S212). If the prescribed number of frames K and the number of exposed frames are not coincident with each other, the motor 59 is changed over to the stop preparatory operation by duty control or the like through time motor driving circuit 58 (S206), and the timer 61 is operated to start its counting operation (S207). If the timer 61 has counted a predetermined value or greater by the counting operation thereof (S208), advance is made to S210, and if the count is within the predetermined value, advance is made to S209.

The time as this predetermined value is set is set to a time longer than the time from the detection of the first perforation (Pnb) in the non-last frame till the detection of the second perforation (P(n+1)a) when the source voltage of the battery drops to slow down the transportation speed, and shorter than the time from the detection of the first perforation in the last frame until the film becomes unable to be wound any further when the battery is replaced with a new battery, whereby the source voltage is heightened and the transportation speed becomes higher. Thereby, the control circuit 50 effects duty control or the like to the motor driving circuit 58 after the detection of the first perforation signal to thereby make preparations for stoppage. However, in the case of the last frame, the second perforation signal cannot be detected and therefore, the driving of the motor is stopped after the lapse of a predetermined time.

Figures 6A, 6B, 6C:
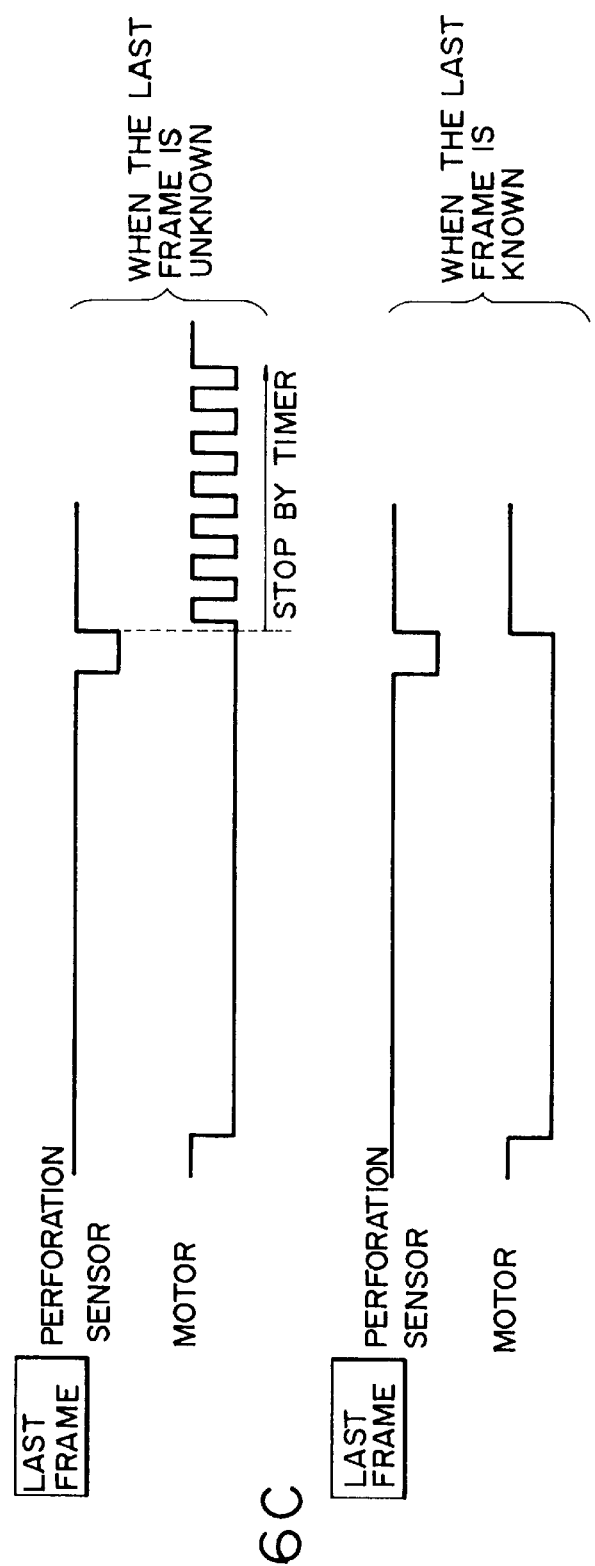
FIGS. 6A to 6C are the time charts of the film transporting operation in the first embodiment of the present invention.

Also, FIG. 6C shows similar signals in the case of the last frame, and particularly shows a case where it is recognized in advance that the detected frame is the last frame. The photoreflector 7 detects the signal of the perforation Pnb in the film and inputs a perforation signal. Thereby, the control circuit 50 causes the motor driving circuit 58 to stop the driving of the motor immediately after the detection of the first perforation signal.

Figure 7:
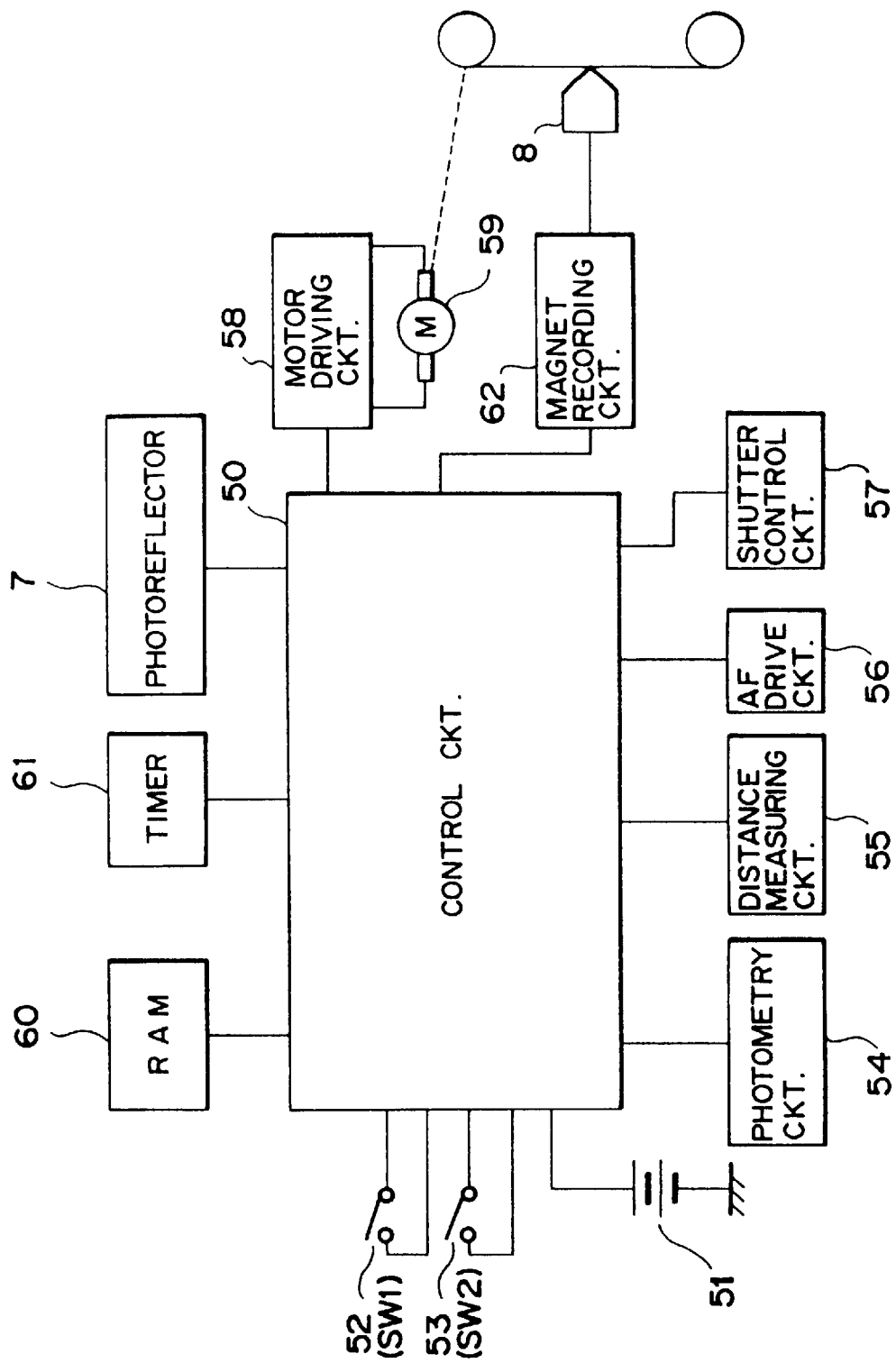
FIG. 7 is a block diagram schematically showing the construction of a camera according to a second embodiment of the present invention.
Figure 8:
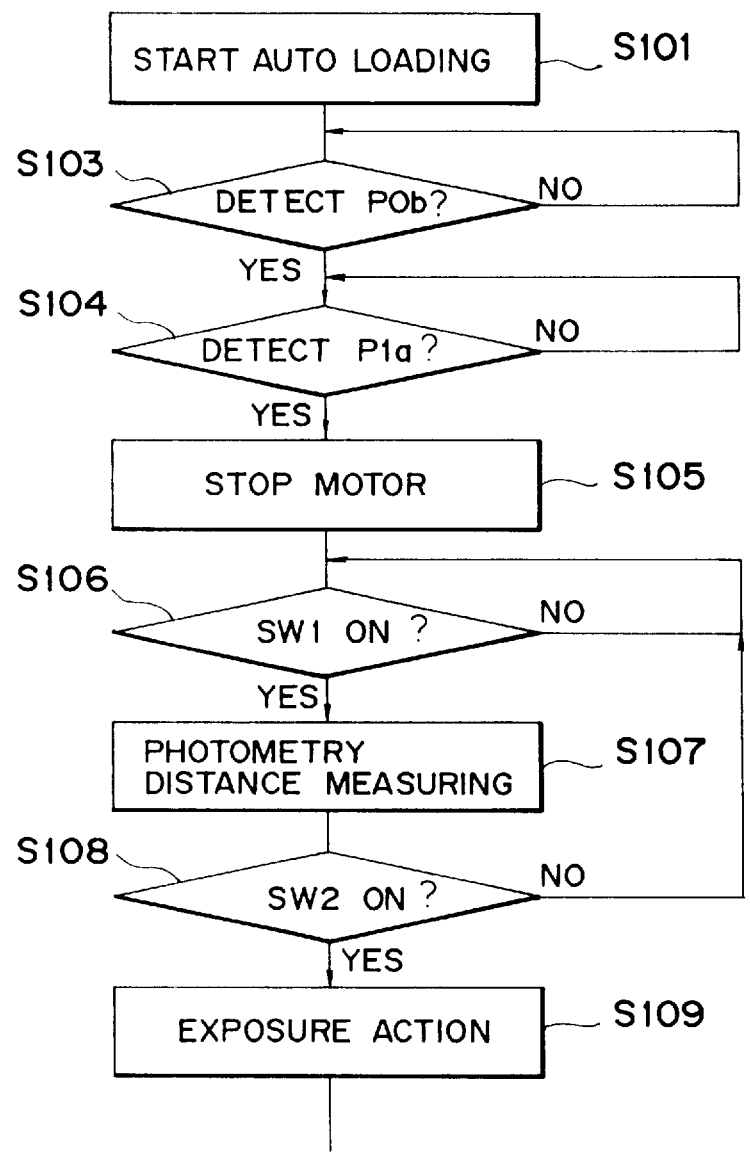
FIG. 8 is a flowchart showing film loading in the camera according to second and fourth embodiments of the present invention and the photographing operation onto the first frame.
Figure 9:
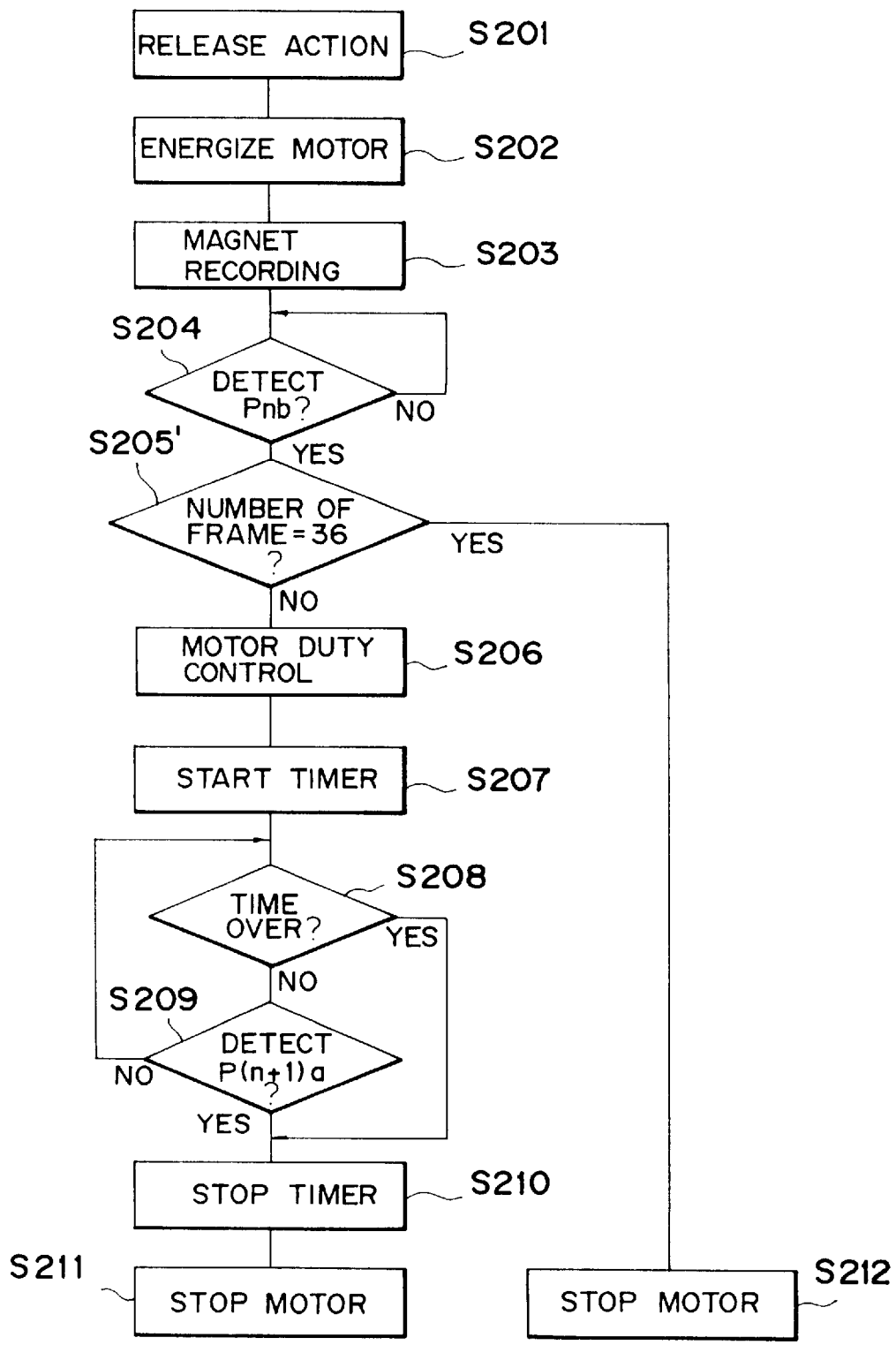
FIG. 9 is a flowchart showing the operations of essential portions in the second embodiment of the present invention.

FIGS. 7 to 9 show a second embodiment of the present invention. In these figures, constructions and operations identical or corresponding to those in the first embodiment are given the same reference characters and will not be described, but only different constructions and operations will hereinafter be described.

In FIG. 7, the absence of the number of frame read unit 64 is the difference from FIG. 3. Accordingly, in the process of FIG. 8, the number of frame information reading operation in S102 is not performed. This is a camera having no final frame detecting means, and in an inexpensive camera, such a simple construction is also conceivable. So, in this case, at S205' in FIG. 9, whether the number of frames is coincident with 36 is judged, and if it is coincident with 36, advance is made to S212, where the motor is stopped immediately. This supposes the maximum number of frames of commercially available film, and the number of frames is not limited to 36.

Figure 5:
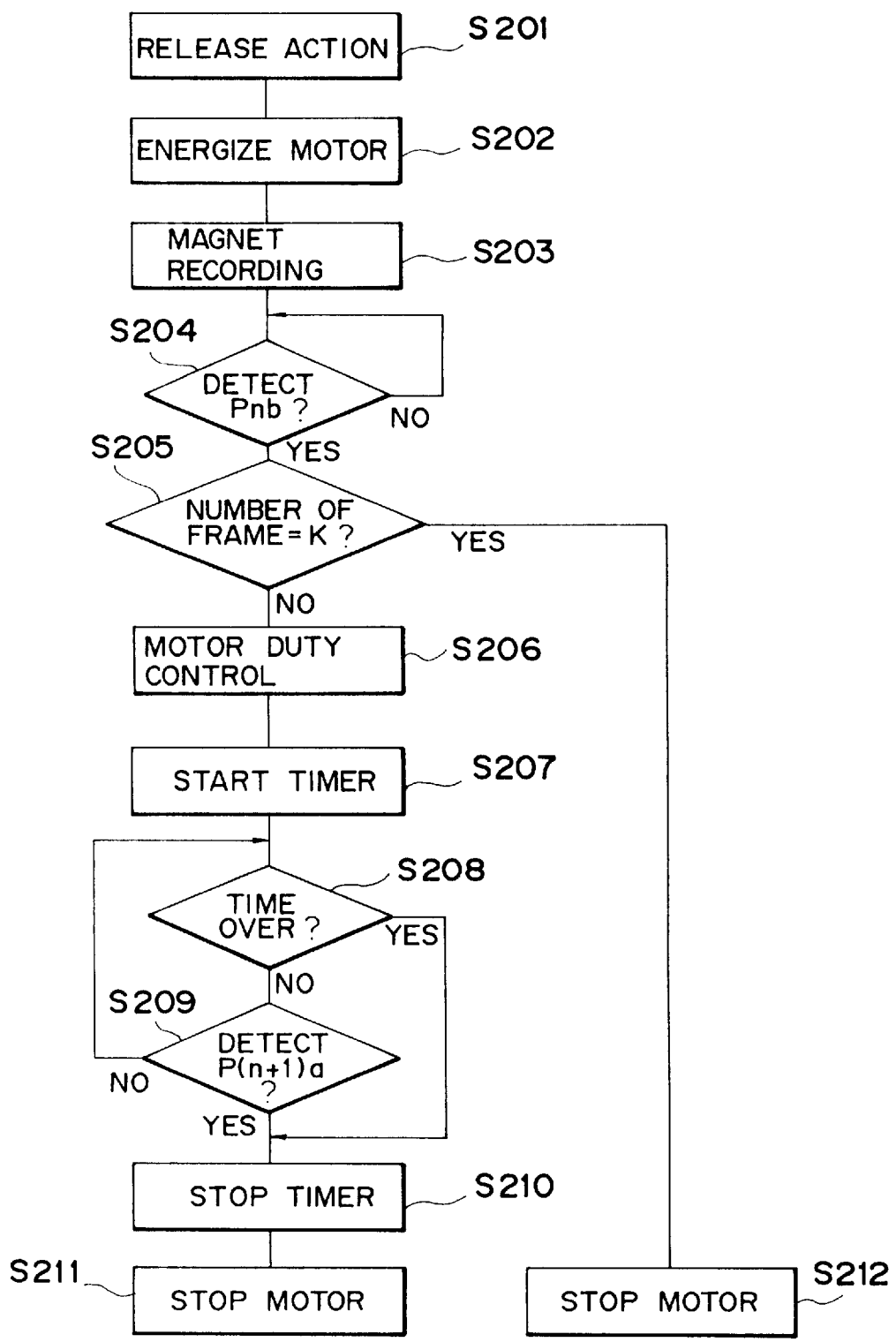
FIG. 5 is a flowchart showing the operations of essential portions in the first embodiment of the present invention.
Figure 10:
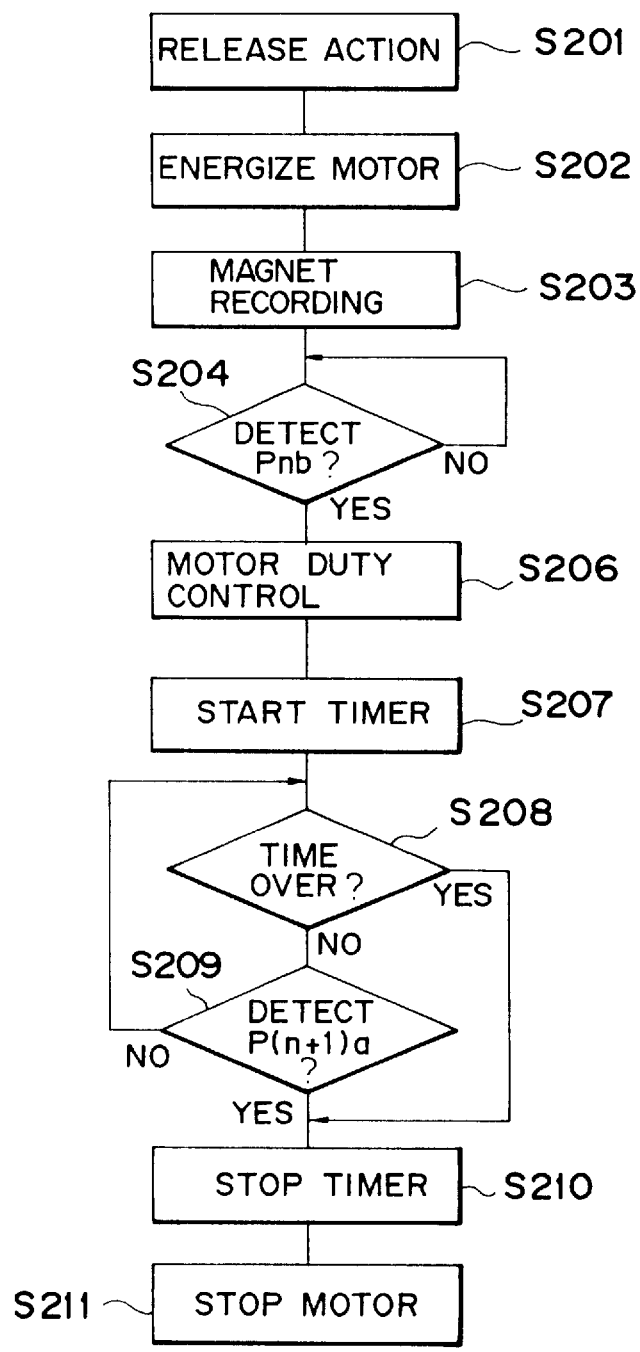
FIG. 10 is a flowchart showing a third embodiment of the film winding operation after the photographing shown in FIG. 5.

FIG. 10 is a flowchart showing a third embodiment regarding the film winding operation after the photographing shown in FIG. 5. Again in FIG. 10, operations identical to those in FIG. 5 are given identical step numbers and will not be described. In the process of FIG. 10, the judgment as to whether the detected frame is the last frame is not done and therefore, the processes of steps S205 and S212 are not carried out and accordingly, after the detection of the first perforation in every frame of the film, the operation of the motor is stopped by the timer 61 from the second perforation or the first perforation.

Figure 11:
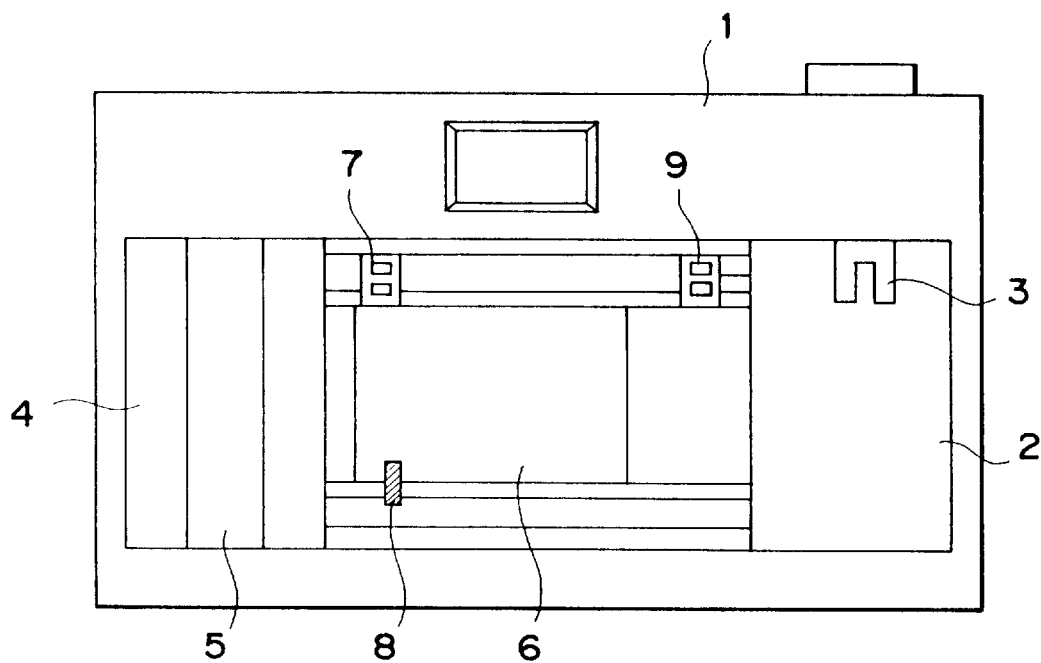
FIG. 11 is a rear view of a camera which is a fourth embodiment of the present invention with the back lid thereof removed.
Figure 12:
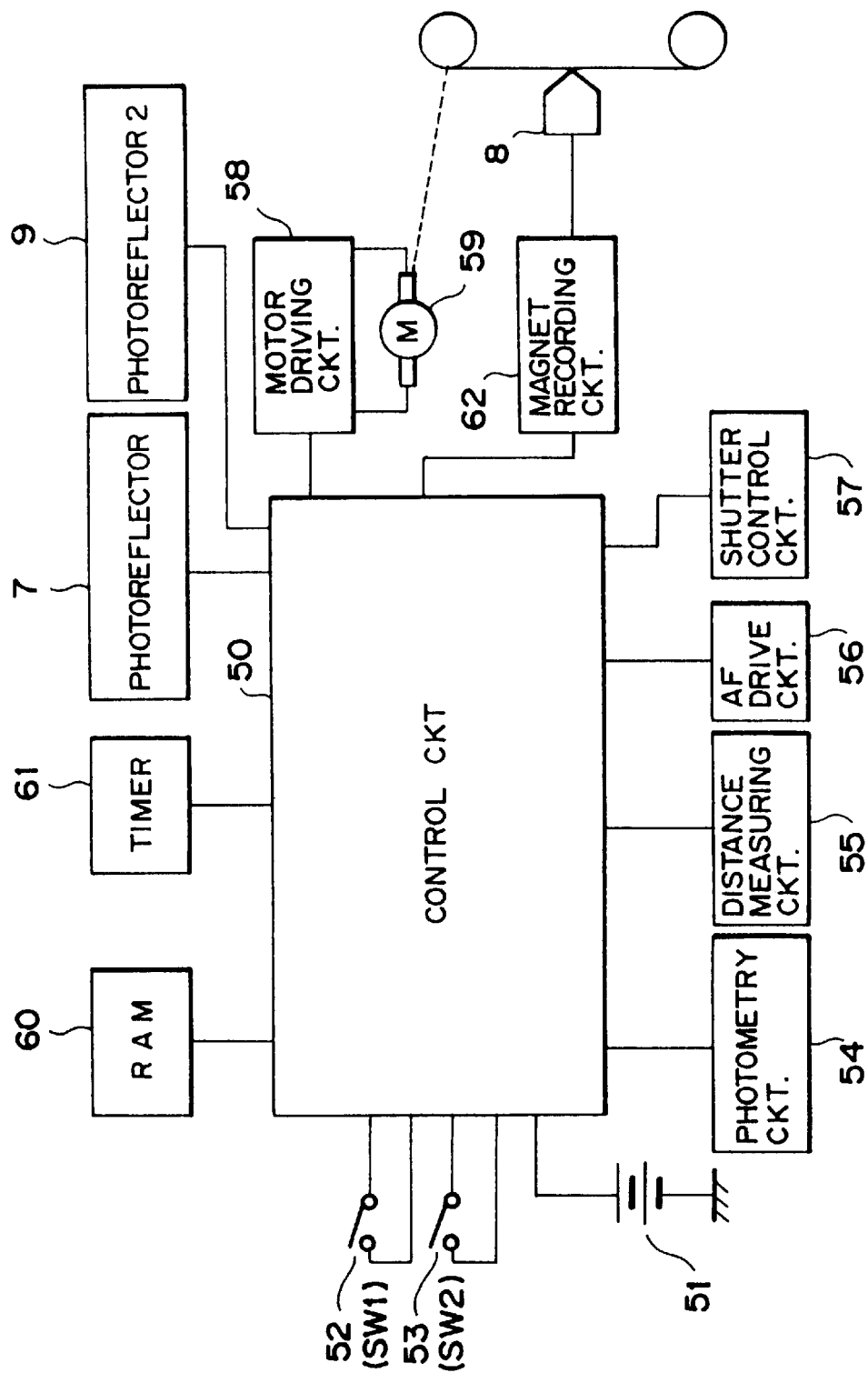
FIG. 12 is a block diagram schematically showing the construction of the camera of FIG. 11.
Figure 13:
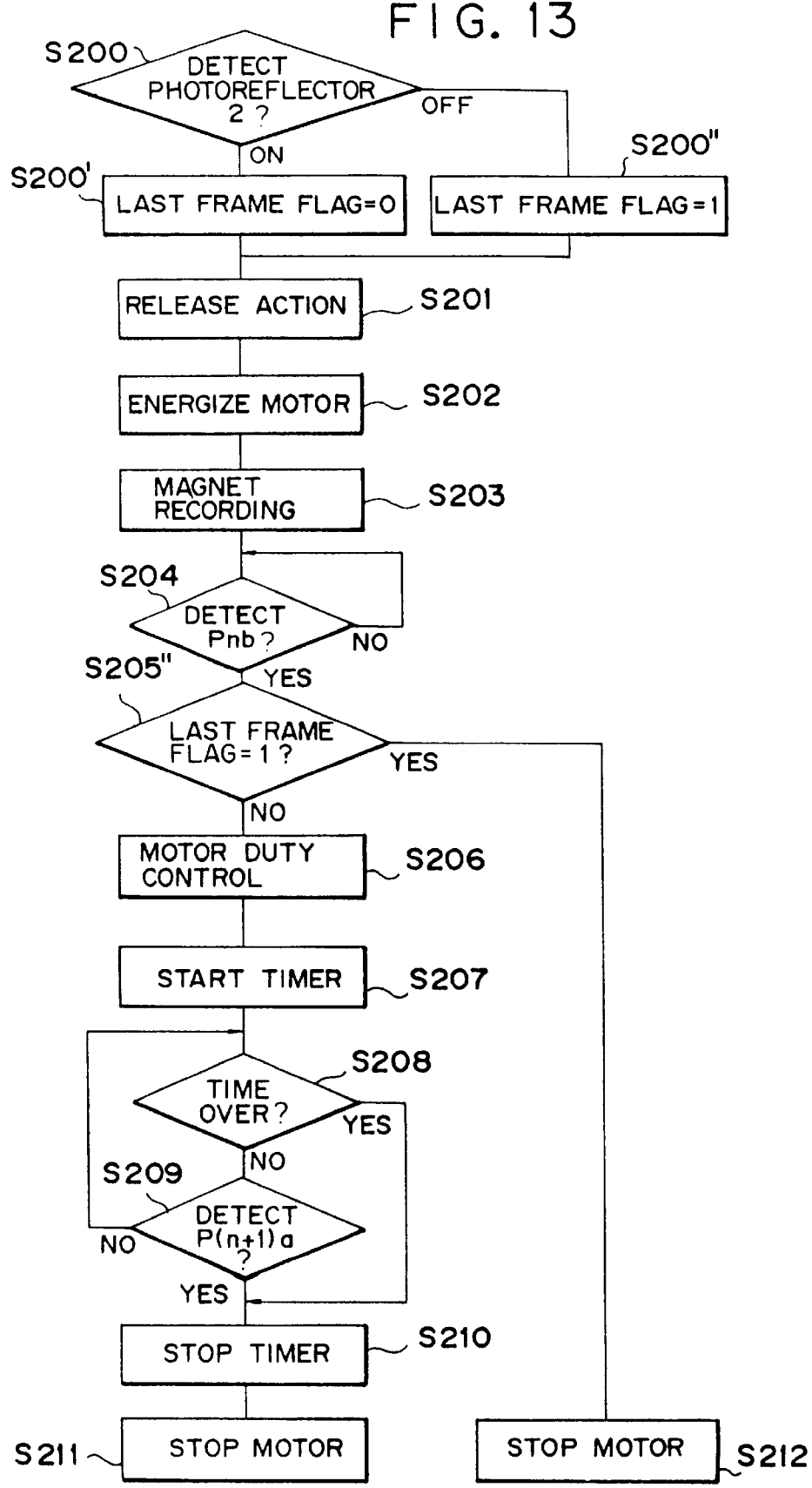
FIG. 13 is a flowchart showing the operations of essential portions in the fourth embodiment of the present invention.

FIGS. 11 to 13 show a fourth embodiment of the present invention. Again in FIGS. 11 to 13, operations similar to those in the first embodiment of the present invention are given similar step numbers and will not be described, and different operations only will hereinafter be described.

In FIG. 11, reference numeral 9 designates a second photoreflector. The second perforation exists in each of the non-last frames and only one perforation exists in the last frame and therefore, a sensor is disposed at the opposed location of the second perforation P(n+1)a, whereby whether the detected frame is the last frame is judged by the presence or absence of the perforation P(n+1)a.

Accordingly, the difference of FIG. 12 from FIG. 3 is not the provision of the number of frame read unit 64, but the provision of the photoreflector 9. Accordingly, again in this fourth embodiment, as in FIG. 8, the process corresponding to S102 in FIG. 4 is not executed.

In FIG. 13, at S200 subsequent to S109 in FIG. 8, the detection of the perforation P(n+1)a is effected by the photoreflector 9. This takes place before the movement of the film and therefore, the detection of the last frame is possible, and if the perforation P(n+1)a is detected, the last frame flag is rendered into 0 at S200', and if the perforation P(n+1)a is not detected, the last frame flag is rendered into 1 at S200". If at S205", the last frame flag is 0, S206–S211 are executed, and if the last frame flag is 1, the motor is immediately stopped in S212.

In the above-described embodiments, in the case of the last frame, the motor is stopped immediately after the first perforation is detected, but the motor may be stopped in a predetermined time shorter than the time of the timer for stopping the motor in a usual case.

Also, in the above-described embodiments, design may of course be made in such a manner that rewinding is automatically effected after the stoppage of the motor, i.e., after the stoppage of film transportation.

Further, in the above-described embodiments, the perforations may be other index marks, and any other image recording medium than film may of course be applied to the present invention.

Also, in the above-described embodiments, the manner of controlling the transportation of the film is changed in response to the detection of the first perforation after the last frame, but of course, manners of controlling other constructions may be changed.

Also, the present invention is of course equally applicable to a camera of a so-called prewind type in which, after a film has once been all wound, photographing is effected while the film is rewound one frame by one frame.

Also, of course, the above-described embodiments may be combined together.

According to the above-described embodiments, when for example, the last frame of the film is recognizable, film winding can be stopped at the first perforation only for the last frame to thereby achieve the shortening of the winding time or the rewinding time of the last frame.

Also, the fact that unnecessary winding and rewinding are not effected leads to various effects including energy saving.

What is claimed is:

1. An apparatus adapted for use with a cartridge containing an image recording medium having at least one image recording medium index mark, said apparatus comprising:

a frame transporting device that effects frame transportation of the image recording medium;

a detecting device that detects an image recording medium index mark;

determining means for determining the presence of a final frame of the image recording medium on the basis of information from the cartridge; and control means for effecting a predetermined control operation when said detecting device first detects an image recording medium index mark after frame transportation of the final frame is started by said frame transporting device, and said determining means determines the presence of the final frame.

2. An apparatus according to claim 1, wherein the image recording medium comprises a film.

3. An apparatus according to claim 1, wherein said detecting device comprises an optical detector.

4. An apparatus according to claim 1, wherein the image recording medium index mark comprises a perforation.

5. An apparatus according to claim 1, wherein said determining means comprises means for detecting a prescribed frame number from a cartridge for the image recording medium.

6. An apparatus according to claim 5, wherein said determining means comprises means for counting an exposed frame number.

7. An apparatus according to claim 6, wherein said determining means comprises means for determining the final frame on the basis of the prescribed frame number and the exposed frame number.

8. An apparatus according to claim 1, wherein said determining means comprises means for counting an exposed frame number.

9. An apparatus according to claim 1, wherein said frame transporting device comprises means for winding.

10. An apparatus according to claim 1, wherein said frame transporting device comprises a motor.

11. An apparatus according to claim 1, wherein said control means comprises means for controlling said frame transporting device, as the predetermined control operation.

12. An apparatus according to claim 1, wherein said control means comprises means for controlling a stoppage of the frame transportation of the image recording medium, as the predetermined control operation.

13. An apparatus according to claim 1, wherein said control means comprises means for stopping the frame transportation of the image recording medium, as the predetermined control operation.

14. An apparatus according to claim 1, wherein said control means comprises means for stopping the frame transportation of the image recording medium after a predetermined time, as the predetermined control operation.

15. An apparatus according to claim 1, wherein said control means comprises means for effecting a control operation different from the predetermined control operation in response to said determining means not determining the final frame.

16. An apparatus according to claim 1, wherein said control means comprises means for effecting a control operation different from the predetermined control operation when said detecting device detects a second image recording medium index mark after frame transportation of the final frame is started by said frame transporting device, and said determining means does not determine the presence of the final frame.

17. An apparatus according to claim 16, wherein said control means comprises means for stopping the frame transportation of the image recording medium when said detecting device detects a second image recording medium index mark after frame transportation of the final frame is started by said frame transporting device, and said determining means does not determine the presence of the final frame.

18. An apparatus according to claim 15, wherein said control means comprises means for starting time counting when said detecting device first detects an image recording medium index mark after frame transportation of the final frame is started by said frame transporting device, and said determining means does not determine the presence of the final frame.

19. An apparatus according to claim 15, wherein said control means comprises means for stopping the frame transportation of the image recording medium by counting a predetermined time, where counting the predetermined time is started when said detecting device first detects an image recording medium index mark after frame transportation of the final frame is started by said frame transporting device, and said determining means does not determine the presence of the final frame.

20. An apparatus according to claim 15, wherein said control means comprises means for duty-controlling said frame transporting device when said detecting device first detects an image recording medium index mark after frame transportation of the final frame is started by said frame transporting device, and said determining means does not determine the presence of the final frame is present.

21. An apparatus according to claim 20, wherein said control means comprises means for stopping the frame transportation of the image recording medium when said detecting device detects a second image recording medium index mark after frame transportation of the final frame is started by the frame transporting device, and said determining means does not determine the presence of the final frame.

22. An apparatus according to claim 15, wherein said control means comprises means for preparing the stoppage of the frame transportation of the image recording medium when said detecting device first detects an image recording medium index mark after frame transportation of the final frame is started by said frame transporting device, and said determining means does not determine the presence of the final frame.

23. An apparatus according to claim 22, wherein said control means comprises means for stopping the frame transportation of the image recording medium when said detecting device detects a second image recording medium index mark after frame transportation of the final frame is started by said frame transporting device, and said determining means does not determine the presence of the final frame.

24. An apparatus according to claim 1, wherein said determining means comprises means for determining the final frame in response to an exposed frame number being counted as thirty-six frames.

25. An apparatus according to claim 1, wherein said determining means comprises means for determining the final frame is present when said detecting device is in a state in which frame transportation of the image recording medium is not performed.

26. An apparatus adapted to use an image recording medium having at least one image recording medium index mark, said apparatus comprising:
   a frame transporting device that effects frame transportation of the image recording medium;
   a first detecting device that detects an image recording medium index mark while frame transporting of the image recording medium by said frame transporting device is being performed;
   a second detecting device that detects an image recording medium index mark when a frame transporting operation of the image recording medium by said frame transporting device is not being performed;
   first determining means for effecting a first determination in response to a detection by said first detecting device; and
   second determining means for effecting a second determination in response to a detection by said second detecting device.

27. An apparatus according to claim 26, wherein said first and second detecting devices are disposed at different locations.

28. An apparatus according to claim 26, wherein said image recording medium comprises film.

29. An apparatus according to claim 26, wherein at least one of said first and second detecting devices comprises an optical detector.

30. An apparatus according to claim 26, wherein the image recording medium index mark comprises a perforation.

31. An apparatus according to claim 26, further comprising third determining means for detecting a prescribed frame number from a cartridge for the image recording medium.

32. An apparatus according to claim 31, wherein said third determining means comprises means for counting an exposed frame number.

33. An apparatus according to claim 32, wherein said third determining means comprises means for determining a final frame on the basis of the prescribed frame number and the exposed frame number.

34. An apparatus according to claim 26, further comprising means for counting the exposed frame number.

35. An apparatus according to claim 26, wherein said frame transporting device comprises means for winding.

36. An apparatus according to claim 26, wherein said frame transporting device comprises a motor.

37. An apparatus according to claim 26, wherein said second determining means comprises means for determining a final frame.

38. An apparatus according to claim 37, further comprising control means for effecting a predetermined control operation in response to said second determining means determining the final frame.

39. An apparatus according to claim 38, wherein said control means comprises means for controlling said frame transporting device, as the predetermined control operation.

40. An apparatus according to claim 38, wherein said control means comprises means for controlling a stoppage of the frame transportation of said image recording medium, as the predetermined control operation.

41. An apparatus according to claim 38, wherein said control means comprises means for stopping the frame transportation of said image recording medium, as the predetermined control operation.

42. An apparatus according to claim 38, wherein said control means comprises means for stopping the frame transportation of said image recording medium after a predetermined time, as the predetermined control operation.

43. An apparatus according to claim 38, wherein said control means comprises means for effecting a control operation different from the predetermined control operation in response to said second determining means not determining the final frame.

44. An apparatus according to claim 43, wherein said control means comprises means for starting time counting when said first detecting device first detects an image recording medium index mark after frame transportation of the final frame is started by said frame transporting device, and said second determining means does not determine the presence of the final frame.

45. An apparatus according to claim 43, wherein said control means comprises means for stopping frame transportation of the image recording medium by counting a predetermined time, where counting the predetermined time is started by said first detecting device first detecting an image recording medium index mark after frame transportation of the final frame is started by said frame transporting device, and said second determining means does not determines the presence of the final frame.

46. An apparatus according to claim 43, wherein said control means comprises means for duty-controlling said frame transporting device when said first detecting device first detects an image recording medium index mark after frame transportation of the final frame is started by said frame transporting device, and said second determining means does not determine the presence of the final frame.

47. An apparatus according to claim 46, wherein said control means comprises means for stopping frame transportation of the image recording medium when said first detecting device detects a second image recording medium index mark after frame transportation of the final frame is started by the frame transporting device, and said second determining means does not determine the presence of the final frame.

48. An apparatus according to claim 43, wherein said control means comprises means for preparing the stoppage of frame transportation of the image recording medium when said first detecting device first detects an image recording medium index mark after frame transportation of the final frame is started by said frame transporting device, and said second determining means does not determine the presence of the final frame.

49. An apparatus according to claim 48, wherein said control means comprises means for stopping frame transportation of the image recording medium when said first detecting device subsequently detects an image recording medium index mark after frame transportation of the final frame is started by said frame transporting device, and said second determining means does not determine the presence of the final frame.

50. An apparatus according to claim 38, wherein said control means comprises means for effecting a control operation different from the predetermined control operation when said first detecting device detects a second image recording medium index mark after frame transportation of the final frame is started by said frame transporting device, and said second determining means does not determine the presence of the final frame.

51. An apparatus according to claim 50, wherein said control means comprises means for stopping frame transportation of said image recording medium when said first detecting device detects a second image recording medium index mark after frame transportation of the final frame is started by said frame transporting device, and said second determining means does not determine the presence of the final frame.

52. An apparatus according to claim 26, further comprising control means for effecting a predetermined control operation in response to said second determining means.

53. An apparatus according to claim 52, wherein said control means comprises means for controlling said frame transporting device, as the predetermined control operation.

54. An apparatus according to claim 52, wherein said control means comprises means for controlling a stoppage of the frame transportation of the image recording medium, as the predetermined control operation.

55. An apparatus according to claim 52, wherein said control means comprises means for stopping the frame transportation of the image recording medium, as the predetermined control operation.

56. An apparatus according to claim 52, wherein said control means comprises means for stopping the frame transportation of the image recording medium after a predetermined time, as the predetermined control operation.

57. An apparatus according to claim 52, wherein said control means comprises means for effecting the predetermined control when said first detecting device detects a second image recording medium index mark after frame transportation is started by said frame transporting device.

58. An apparatus according to claim 57, wherein said control means comprises means for stopping frame transportation of the image recording medium when said first detecting device detects a second image recording medium index mark after frame transportation is started by said frame transporting device.

59. An apparatus according to claim 52, wherein said control means comprises means for starting time counting when said first detecting device first detects an image recording medium index mark after frame transportation is started by said frame transporting device, in response to said second determining means.

60. An apparatus according to claim 52, wherein said control means comprises means for stopping frame transportation of said image recording medium by counting a predetermined time, where counting of the predetermined time is started when said first detecting device first detects an image recording medium index mark after frame transportation is started by said frame transporting device, in response to a determination by said second determining means.

61. An apparatus according to claim 52, wherein said control means comprises means for duty-controlling said frame transporting device when said first detecting device first detects an image recording medium index mark after frame transportation is started by said frame transporting device, in response to said second determining means.

62. An apparatus according to claim 61, wherein said control means comprises means for stopping frame transportation of the image recording medium when said first detecting device detects a second image recording medium index mark after frame transportation is started by said frame transporting device, in response to said second determining means.

63. An apparatus according to claim 52, wherein said control means comprises means for preparing a stoppage of the frame transportation of said image recording medium when said first detecting device first detects an image recording medium index mark after frame transportation is started by said frame transporting device, in response to said second determining means.

64. An apparatus according to claim 63, wherein said control means comprises means for stopping frame transportation of the image recording medium when said first detecting device detects a second image recording medium index mark after frame transportation is started by said frame transporting device, in response to said second determining means.

65. A camera adapted to use a cartridge containing an image recording medium having at least one image recording medium index mark, said camera comprising:
   a frame transporting device that effects frame transportation of the image recording medium;
   a detecting device that detects an image recording medium index mark;
   determining means for determining the presence of a final frame of the image recording medium on the basis of information from the cartridge; and
   control means for effecting a predetermined control operation when said detecting device first detects an image recording medium index mark after frame transportation of the final frame is started by said frame transporting device and said determining means determines the presence of the final frame.

66. A camera according to claim 65, wherein the image recording medium comprises a film.

67. A camera according to claim 65, wherein said detecting device comprises an optical detector.

68. A camera according to claim 65, wherein the image recording medium index mark comprises a perforation.

69. A camera according to claim 65, wherein said determining means comprises means for detecting a prescribed frame number from a cartridge for the image recording medium.

70. A camera according to claim 69, wherein said determining means comprises means for counting an exposed frame number.

71. A camera according to claim 70, wherein said determining means comprises means for determining the final frame on the basis of the prescribed frame number and the exposed frame number.

72. A camera according to claim 65, wherein said determining means comprises means for counting an exposed frame number.

73. A camera according to claim 65, wherein said frame transporting device comprises means for winding.

74. A camera according to claim 65, wherein said frame transporting device comprises a motor.

75. A camera according to claim 65, wherein said control means comprises means for controlling said frame transporting device, as the predetermined control operation.

76. A camera according to claim 65, wherein said control means comprises means for controlling a stoppage of the frame transportation of the image recording medium, as the predetermined control operation.

77. A camera according to claim 65, wherein said control means comprises means for stopping the frame transportation of the image recording medium, as the predetermined control operation.

78. A camera according to claim 65, wherein said control means comprises means for stopping the frame transportation of the image recording medium after a predetermined time, as the predetermined control operation.

79. A camera according to claim 65, wherein said control means comprises means for effecting control different from the predetermined control in response to said determining means not determining the final frame.

80. A camera according to claim 79, wherein said control means comprises means for starting time counting when said detecting device first detects an image recording medium index mark after frame transportation of the final frame is started by said frame transporting device, and said determining means does not determine the presence of the final frame.

81. A camera according to claim 79, wherein said control means comprises means for stopping frame transportation of the image recording medium by counting a predetermined time, where counting of the predetermined time is started when said detecting device first detects an image recording medium index mark after frame transportation of the final frame is started by said frame transporting device, when said determining means does not determine the presence of the final frame.

82. A camera according to claim 79, wherein said control means comprises means for duty-controlling said frame transporting device when said detecting device first detects an image recording medium index mark after frame transportation of the final frame is started by said frame transporting device, and said determining means does not determine the presence of the final frame.

83. A camera according to claim 82, wherein said control means comprises means for stopping frame transportation of the image recording medium when said detecting device detects a second image recording medium index mark after frame transportation of the final frame is started by the frame transporting device, and said determining means does not determine the presence of the final frame.

84. A camera according to claim 79, wherein said control means comprises means for preparing the stoppage of a frame transporting operation of the image recording medium when said detecting device first detects an image recording medium index mark after frame transportation of the final frame is started by said frame transporting device, and said determining means does not determine the presence of the final frame.

85. A camera according to claim 84, wherein said control means comprises means for stopping a frame transporting operation of the image recording medium when said detecting device detects a second image recording medium index mark after frame transportation of the final frame is started by said frame transporting device, and said determining means does not determine the presence the final frame.

86. A camera according to claim 65, wherein said control means comprises means for effecting a control operation different from the predetermined control operation when said detecting device detects a second image recording medium index mark after frame transportation of the final frame is started by said frame transporting device and said determining means does not determine the presence of the final frame.

87. A camera according to claim 86, wherein said control means comprises means for stopping frame transportation of the image recording medium when said detecting device detects a second image recording medium index mark after frame transportation of the final frame is started by said frame transporting device and said determining means does not determine the presence of the final frame.

88. A camera according to claim 65, wherein said determining means comprises means for determining the final frame in response to an exposed frame number being counted as thirty-six frames.

89. A camera according to claim 65, wherein said determining means comprises means for determining the final frame is present when said detecting device is in a state in which frame transportation of the image recording medium is not performed.

90. A camera adapted to use an image recording medium having at least one image recording medium index mark, said camera comprising:

a frame transporting device that effects frame transportation of the image recording medium;

a first detecting device that detects an image recording medium index mark while a frame transporting operation of the image recording medium by said frame transporting device is being performed;

a second detecting device that detects an image recording medium index mark when a frame transporting operation of the image recording medium by said frame transporting device is not being performed;

first determining means for effecting a first determination in response to a detection by said first detecting device; and second determining means for effecting a second determination in response to a detection by said second detecting device.

91. A camera according to claim 90, wherein said first and second detecting devices are disposed at different locations.

92. A camera according to claim 90, wherein said image recording medium comprises film.

93. A camera according to claim 90, wherein at least one of said first and second detecting devices comprises an optical detector.

94. A camera according to claim 90, wherein the image recording medium index mark comprises a perforation.

95. A camera according to claim 90, further comprising third determining means for detecting a prescribed frame number from a cartridge for the image recording medium.

96. A camera according to claim 95, wherein said third determining means comprises means for counting an exposed frame number.

97. A camera according to claim 96, wherein said third determining means comprises means for determining a final frame on the basis of the prescribed frame number and the exposed frame number.

98. A camera according to claim 90, further comprising means for counting the exposed frame number.

99. A camera according to claim 90, wherein said frame transporting device comprises means for winding.

100. A camera according to claim 90, wherein said frame transporting device comprises a motor.

101. A camera according to claim 90, wherein said second determining means comprises means for determining a final frame.

102. A camera according to claim 101, further comprising control means for effecting a predetermined control in response to said second determining means determining the final frame.

103. A camera according to claim 102, wherein said control means comprises means for controlling said frame transporting device, as a predetermined control operation.

104. A camera according to claim 102, wherein said control means comprises means for controlling a stoppage of the frame transportation of said image recording medium, as a predetermined control operation.

105. A camera according to claim 102, wherein said control means comprises means for stopping the frame transporting operation of said image recording medium, as a predetermined control operation.

106. A camera according to claim 102, wherein said control means comprises means for stopping the frame transporting operation of said image recording medium after a predetermined time, as a predetermined control operation.

107. A camera according to claim 102, wherein said control means comprises means for effecting a control operation different from the predetermined control in response to said second determining means not determining the final frame.

108. A camera according to claim 107, wherein said control means comprises means for stopping a frame transporting operation of the image recording medium by counting a predetermined time, where counting the predetermined time is started when said first detecting device first detects an image recording medium index mark after frame transportation of the final frame is started by said frame transporting device, and said second determining means does not determine the presence of the final frame.

109. A camera according to claim 107, wherein said control means comprises means for duty-controlling said frame transporting device when said first detecting device first detects an image recording medium index mark after frame transportation of the final frame is started by said frame transporting device, and said second determining means does not determine the presence of the final frame.

110. A camera according to claim 109, wherein said control means comprises means for stopping a frame transporting operation of the image recording medium when said first detecting device detects a second image recording medium index mark after frame transportation of the final frame is started by the frame transporting device, and said second determining means does not determine the presence of the final frame.

111. A camera according to claim 107, wherein said control means comprises means for preparing the stoppage of a frame transporting operation of the image recording medium when said first detecting device first detects an image recording medium index mark after frame transportation of the final frame is started by said frame transporting device, and said second determining means does not determine the presence of the final frame.

112. A camera according to claim 111, wherein said control means comprises means for stopping a frame transporting operation of the image recording medium when said first detecting device detects a second image recording medium index mark after frame transportation of the final frame is started by said frame transporting device, and said second determining means does not determine the presence of the final frame.

113. A camera according to claim 102, wherein said control means comprises means for effecting a control operation different from the predetermined control when said first detecting device detects a second image recording medium index mark after frame transportation of the final frame is started by said frame transporting device, and said second determining means does not determine the presence of the final frame.

114. A camera according to claim 113, wherein said control means comprises means for stopping a frame transporting operation of said image recording medium when said first detecting device detects a second image recording medium index mark after frame transportation of the final frame is started by said frame transporting device, and said second determining means does not determine the presence of the final frame.

115. A camera according to claim 107, wherein said control means comprises means for starting time counting when said first detecting device first detects an image recording medium index mark after frame transportation of the final frame is started by said frame transporting device, and said second determining means does not determine the presence of the final frame.

116. A camera according to claim 90, further comprising control means for effecting a predetermined control operation in response to said second determining means.

117. A camera according to claim 116, wherein said control means comprises means for controlling said frame transporting device, as the predetermined control operation.

118. A camera according to claim 116, wherein said control means comprises means for controlling a stoppage of the frame transportation of the image recording medium, as the predetermined control operation.

119. A camera according to claim 116, wherein said control means comprises means for stopping the frame transporting operation of the image recording medium, as the predetermined control operation.

120. A camera according to claim 116, wherein said control means comprises means for stopping the frame transporting operation of the image recording medium after a predetermined time, as the predetermined control operation.

121. A camera according to claim 116, wherein said control means comprises means for effecting the predetermined control operation when said first detecting device detects a second image recording medium index mark after frame transportation is started by said frame transporting device.

122. A camera according to claim 121, wherein said control means comprises means for stopping a frame transporting operation of the image recording medium when said first detecting device subsequently detects an image recording medium index mark after frame transportation is started by said frame transporting device.

123. A camera according to claim 116, wherein said control means comprises means for starting time counting when said first detecting device first detects an image recording medium index mark after frame transportation is started by said frame transporting means, in response to said second determining means.

124. A camera according to claim 116, wherein said control means comprises means for stopping a frame transporting operation of said image recording medium by counting a predetermined time, where counting the predetermined time is started when said first detecting device first detects an image recording medium index mark after frame transportation is started by said frame transporting device, in response to said second determining means.

125. A camera according to claim 116, wherein said control means comprises means for duty-controlling said frame transporting device when said first detecting device first detects an image recording medium index mark after frame transportation is started by said frame transporting device, in response to said second determining means.

126. A camera according to claim 125, wherein said control means comprises means for stopping a frame transporting operation of the image recording medium when said first detecting device detects a second image recording medium index mark after frame transportation is started by said frame transporting device, in response to said second determining means.

127. A camera according to claim 116, wherein said control means comprises means for preparing a stoppage of a frame transporting operation of said image recording medium when said first detecting device first detects an image recording medium index mark after frame transportation is started by said frame transporting device, in response to said second determining means.

128. A camera according to claim 127, wherein said control means comprises means for stopping a frame transporting operation of the image recording medium when said first detecting device detects a second image recording medium index mark after frame transportation is started by said frame transporting device, in response to said second determining means.

129. An apparatus adapted for use with an image recording medium having at least one image recording medium index mark, said apparatus comprising:

a frame transporting device that effects frame transportation of the image recording medium;

a first detecting device that detects an image recording medium index mark on the image recording medium during a frame transportation operation;

a second detecting device that detects the presence of an image recording medium index mark at a predetermined position when the image recording medium is stationary;

first determining means for making a first determination for use in control of the camera in accordance with a detection by said second detecting device; and second determining means for making a second determination for use in control of the camera in accordance with a detection by said first detecting device and the first determination.

130. An apparatus according to claim 129, further comprising a control unit responsive to the second determination to effect a predetermined control operation.

* * * * *

UNITED STATES PATENT AND TRADEMARK OFFICE
CERTIFICATE OF CORRECTION

PATENT NO. : 5,845,164

DATED : December 1, 1998

INVENTOR(S) : KENICHIRO AMANO

It is certified that error appears in the above-identified patent and that said Letters Patent is hereby corrected as shown below:

COLUMN 1,
Line 14, "film." should read --a film.--;
Line 18, "film" should read --a film--; and COLUMN 2,
Line 23, "mark" should read --marks--;
Line 28, "index" should read --an index--; and
Line 47, "film" should read --a film--.
Line 20, "mark" should read --marks--.

COLUMN 3,
Line 25, "film" should read --a film--; and
Line 44, "the second" should read --in the second--.

COLUMN 4,
Line 12, "film," should read --the film,--.

COLUMN 5,
Line 27, "is set is set" should read --is set--; and
Line 61, "tion" should read --tions--.

COLUMN 6,
Line 52, "than film" should read --other than a film--.

UNITED STATES PATENT AND TRADEMARK OFFICE
CERTIFICATE OF CORRECTION

PATENT NO. : 5,845,164

DATED : December 1, 1998

INVENTOR(S) : KENICHIRO AMANO

It is certified that error appears in the above-identified patent and that said Letters Patent is hereby corrected as shown below:

COLUMN 7,
Line 19, "said detecting device first detects an" should be deleted;
Lines 20-21 should be deleted;
Line 22, "transporting device, and" should be deleted; and
Line 23, "frame." should read --frame and said detecting device first detects an image recording medium index mark after frame transportation of the final frame is started by said frame transporting device.--.

COLUMN 10,
Line 26, "mines" should read --mine--.

COLUMN 11,
Line 27, "control" should read --control operation--.

COLUMN 12,
Line 22, "said detecting device first detects an" should be deleted;
Lines 23-24 should be deleted;
Line 25, "transporting device and" should be deleted; and

UNITED STATES PATENT AND TRADEMARK OFFICE
CERTIFICATE OF CORRECTION

PATENT NO.   : 5,845,164

DATED        : December 1, 1998

INVENTOR(S)  : KENICHIRO AMANO

It is certified that error appears in the above-identified patent and that said Letters Patent is hereby corrected as shown below:

COLUMN 12 (Cont.),
Line 26, "frame." should read --frame and said detecting device first detects an image recording medium index mark after frame transportation of the final frame is started by said frame transporting device.--.

COLUMN 13,
Line 1, "control" should read --control operation--.

COLUMN 15,
Line 50, "control" should read --control operation--.

Signed and Sealed this

Twenty-sixth Day of October, 1999

Attest:

Q. TODD DICKINSON

*Attesting Officer*       *Acting Commissioner of Patents and Trademarks*